United States Patent
Yitshak et al.

(10) Patent No.: US 12,184,619 B2
(45) Date of Patent: Dec. 31, 2024

(54) SYSTEM AND METHOD FOR IDENTIFYING SERVICES WITH WHICH ENCRYPTED TRAFFIC IS EXCHANGED

(71) Applicant: COGNYTE TECHNOLOGIES ISRAEL LTD., Herzliya Pituach (IL)

(72) Inventors: Yishay Yitshak, Herzliya Pituach (IL); Zeev Kalyuzhner, Herzliya Pitauch (IL)

(73) Assignee: COGNYTE TECHNOLOGIES ISRAEL LTD. (IL)

( * ) Notice: Subject to any disclaimer, the term of this patent is extended or adjusted under 35 U.S.C. 154(b) by 322 days.

(21) Appl. No.: 17/715,486

(22) Filed: Apr. 7, 2022

(65) Prior Publication Data
US 2022/0337560 A1    Oct. 20, 2022

(30) Foreign Application Priority Data

Apr. 14, 2021 (IL) .......................................... 282353

(51) Int. Cl.
*H04L 9/40* (2022.01)
*H04L 61/4511* (2022.01)
*H04L 67/02* (2022.01)

(52) U.S. Cl.
CPC ...... *H04L 63/0414* (2013.01); *H04L 61/4511* (2022.05); *H04L 63/20* (2013.01); *H04L 63/304* (2013.01); *H04L 67/02* (2013.01)

(58) Field of Classification Search
CPC ...... H04L 63/0414; H04L 63/20; H04L 67/02
See application file for complete search history.

(56) References Cited

U.S. PATENT DOCUMENTS

| | | |
|---|---|---|
| 10,924,456 B1 | 2/2021 | Moore et al. |
| 2012/0233311 A1* | 9/2012 | Parker ............... H04L 43/022 709/224 |
| 2018/0103056 A1* | 4/2018 | Kohout .............. H04L 41/0686 |
| 2020/0304519 A1 | 9/2020 | Offri et al. |
| 2021/0067455 A1 | 3/2021 | Lahtiranta et al. |

FOREIGN PATENT DOCUMENTS

EP    3700147    8/2020

OTHER PUBLICATIONS

Hyun-Min An et al., "Application Traffic Classification Using Statistic Signature", 2013 15th Asia-Pacific Network Operations and Management Symposium (Apnoms), Sep. 1, 2013, pp. 1-6.
European Search Report—corresponding EP Application No. 22168266, dated Sep. 5, 2022, 9 pages.

* cited by examiner

*Primary Examiner* — Esther B. Henderson
(74) *Attorney, Agent, or Firm* — ISUS INTELLECTUAL PROPERTY PLLC; Anthony Jason Mirabito (57) ABSTRACT

System and method to receive respective copies of communication packets exchanged, over a network, with respective communication endpoints belonging to respective servers, the packets containing respective endpoint identifiers, each of which includes a respective Internet Protocol (IP) address and port number identifying the communication endpoint with which the packet containing the endpoint identifier was exchanged. The processor is further configured to ascertain respective services that use the communication endpoints, by communicating investigative traffic over the network. The processor is further configured to store an association between the communication endpoints and the services, respectively, in the memory, in response to ascertaining the services.

18 Claims, 8 Drawing Sheets

SYSTEM AND METHOD FOR IDENTIFYING SERVICES WITH WHICH ENCRYPTED TRAFFIC IS EXCHANGED

FIELD OF THE DISCLOSURE

The present disclosure is related to the field of communication monitoring.

BACKGROUND OF THE DISCLOSURE

In many cases, network traffic exchanged with a server, such as a Domain Name Server (DNS) or the server of a domain or an application, is encrypted.

Lin, Ying-Dar et al., "Application classification using packet size distribution and port association," Journal of Network and Computer Applications 32.5 (2009): 1023-1030 describes classifying traffic by analyzing the variances of packet sizes of connections without analyzing packet payload. Each connection is first transformed into a point in a multi-dimensional space according to its packet size distribution (PSD). Then it is compared with the representative points of pre-defined applications and recognized as the application having a minimum distance. Once a connection is identified as a specific application, port association is used to accelerate the classification by combining it with the other connections of the same session.

An, Hyun-Min et al., "Application traffic classification using statistic signature," 2013 15th Asia-Pacific Network Operations and Management Symposium (APNOMS), IEEE, 2013 proposes an application-level traffic classification method. The method creates a statistic signature using payload size, transmission order, and direction of the first N packets in a flow, and uses this to classify application traffic.

SUMMARY OF THE DISCLOSURE

There is provided, in accordance with some embodiments of the present invention, a system including a memory and a processor. The processor is configured to receive respective copies of communication packets exchanged, over a network, with respective communication endpoints belonging to respective servers, the packets containing respective endpoint identifiers, each of which includes a respective Internet Protocol (IP) address and port number identifying the communication endpoint with which the packet containing the endpoint identifier was exchanged. The processor is further configured to ascertain respective services that use the communication endpoints, by communicating investigative traffic over the network. The processor is further configured to store an association between the communication endpoints and the services, respectively, in the memory, in response to ascertaining the services.

In some embodiments,
the services include at least one domain,
the investigative traffic includes a Domain Name System (DNS) query for the domain, and
the processor is configured to ascertain that the domain uses a particular one of the communication endpoints by:
receiving a DNS response to the DNS query, and
ascertaining that the domain uses the particular one of the communication endpoints, in response to the endpoint identifier that identifies the particular one of the communication endpoints being included in the DNS response.

In some embodiments,
the services include at least one domain,
the investigative traffic includes a Hypertext Transfer Protocol (HTTP) request to a particular one of the communication endpoints, and
the processor is configured to ascertain that the domain uses the particular one of the communication endpoints by:
receiving a certification error response to the HTTP request, and
ascertaining that the domain uses the particular one of the communication endpoints, in response to a name of the domain being included in the certification error response.

In some embodiments,
the processor is further configured to:
compute respective signature vectors for the communication endpoints, each of the signature vectors representing statistical properties of those of the packets that were exchanged with a different respective one of the communication endpoints, and
based on a predefined measure of vector similarity between the signature vectors, cluster the communication endpoints into multiple clusters, and
the processor is configured to store the association by associating each of the clusters, in the memory, with each of the services ascertained to use any one of the communication endpoints in the cluster.

In some embodiments, the processor is further configured to exchange traffic with a particular one of the services, and the processor is configured to compute the signature vector for the communication endpoint used by the particular one of the services based on the exchanged traffic.

In some embodiments,
the processor is further configured to group the packets into multiple groups based on respective positions of the packets in respective flows to which the packets belong, and
the processor is configured to cluster the communication endpoints separately for each of the groups.

In some embodiments, for each of the communication endpoints, the statistical properties include statistical properties of inter-packet times between successive pairs of those of the packets that were exchanged with the communication endpoint.

In some embodiments, for each of the communication endpoints, the statistical properties include statistical properties of respective sizes of those of the packets that were exchanged with the communication endpoint.

In some embodiments, the processor is configured to compute the signature vector for the communication endpoint by:
applying one or more functions to the sizes so as to obtain multiple sets of function outputs,
computing respective histograms of the sets of function outputs, and
computing the signature vector from the histograms.

In some embodiments, the processor is configured to compute the signature vector for the communication endpoint by:
applying one or more functions to respective pairs of the sizes, each of the pairs belonging to successive ones of the packets within any flow, so as to obtain multiple sets of function outputs,
computing respective histograms of the sets of function outputs, and
computing the signature vector from the histograms.

In some embodiments, the predefined measure of similarity is a cosine similarity.

There is further provided, in accordance with some embodiments of the present invention, a method including receiving respective copies of communication packets exchanged, over a network, with respective communication endpoints belonging to respective servers, the packets containing respective endpoint identifiers, each of which includes a respective Internet Protocol (IP) address and port number identifying the communication endpoint with which the packet containing the endpoint identifier was exchanged. The method further includes, by communicating investigative traffic over the network, ascertaining respective services that use the communication endpoints. The method further includes, in response to ascertaining the services, storing an association between the communication endpoints and the services, respectively, in a memory.

There is further provided, in accordance with some embodiments of the present invention, a computer software product including a tangible non-transitory computer-readable medium in which program instructions are stored. The instructions, when read by a processor, cause the processor to receive respective copies of communication packets exchanged, over a network, with respective communication endpoints belonging to respective servers, the packets containing respective endpoint identifiers, each of which includes a respective Internet Protocol (IP) address and port number identifying the communication endpoint with which the packet containing the endpoint identifier was exchanged. The instructions further cause the processor to ascertain respective services that use the communication endpoints by communicating investigative traffic over the network. The instructions further cause the processor to store an association between the communication endpoints and the services, respectively, in a memory, in response to ascertaining the services.

The present disclosure will be more fully understood from the following detailed description of embodiments thereof, taken together with the drawings, in which:

DETAILED DESCRIPTION OF EMBODIMENTS

Glossary

In the context of the present application, including the claims, the term "communication endpoint," also referred to herein simply as an "endpoint," refers to an Internet Protocol (IP) address in combination with a communication port.

In the context of the present application, including the claims, a "service" may include a domain or an application, the scope of the term "domain" including a subdomain, and the scope of the term "application" including a subapplication. In general, a subapplication may perform any subset of the functions performed by the application to which the subapplication belongs; for example, an instant messaging application may one subapplication for transferring text and another subapplication for transferring images. Purely illustrative examples of services are the Facebook™ domain referenced by "facebook.com," the Google™ subdomain referenced by "mail.google.com," the Waze™ application, and the WhatsApp™ subapplication for transferring text.

Overview

In some cases, law enforcement agencies may wish to know the services with which a user of interest exchanges traffic. However, this may be challenging in the event that the traffic is encrypted, particularly if DNS queries submitted by the user are also encrypted.

To address this challenge, embodiments of the present disclosure provide a system configured to discover, for a large number of communication endpoints, the respective services that use the communication endpoints. (In the present disclosure, a service that uses a communication endpoint may be said to "correspond to" the communication endpoint.) In performing this discovery, the system may use active techniques, in which the system communicates investigative traffic over the Internet, in addition to passive techniques.

For example, the system may communicate Domain Name System (DNS) queries for a large number of popular domains such that, for each of the domains, the system receives a response containing the identifier of the communication endpoint used by the domain. Each of the domain names may then be stored in association with the corresponding endpoint identifier. (Advantageously, by virtue of the system communicating the DNS queries, this technique may be effective even if the DNS responses are encrypted.)

Alternatively or additionally, given any communication endpoint whose corresponding service is unknown, the system may communicate a Hypertext Transfer Protocol (HTTP) request to the communication endpoint. Subsequently, if a certification error received in response to the HTTP request specifies a domain that uses the communication endpoint, the system may store the domain name in association with the identifier of the communication endpoint.

Typically, the system computes, for each communication endpoint, a signature vector representing statistical properties of traffic exchanged with the communication endpoint. The system further clusters together communication endpoints having similar signature vectors. Upon discovering the service that uses one of the endpoints in a cluster, the system associates the service with all the endpoints in the cluster.

The statistical properties upon which each signature vector is based typically include statistical properties of the sizes of the packets exchanged with the communication endpoint. For example, the system may apply one or more functions to the size of each packet, and, for each of the functions, count the respective numbers of packets for which the function returns various values. (An example function is s%t, where s is the size of the packet, t is a predefined parameter, and "%" indicates the modulo operation.) A similar procedure may be performed for pairs of successive packets. The signature vector may then be constructed from the counts.

The system is further configured to respond to queries from a user of the system. For example, the user may input a particular IP address used by a person of interest. In response to receiving this input, the system may begin monitoring traffic exchanged with the IP address. For each communication endpoint identified in the traffic, the system may check if the service that uses the communication endpoint was already identified. If the service was not yet identified, the system may compute a signature vector for the communication endpoint, and then check if the signature vector matches a cluster already associated with a service. If there is no such match, the system may discover the service using any suitable active discovery technique. Finally, the system may output the name of the service.

System Description

Figure 1:
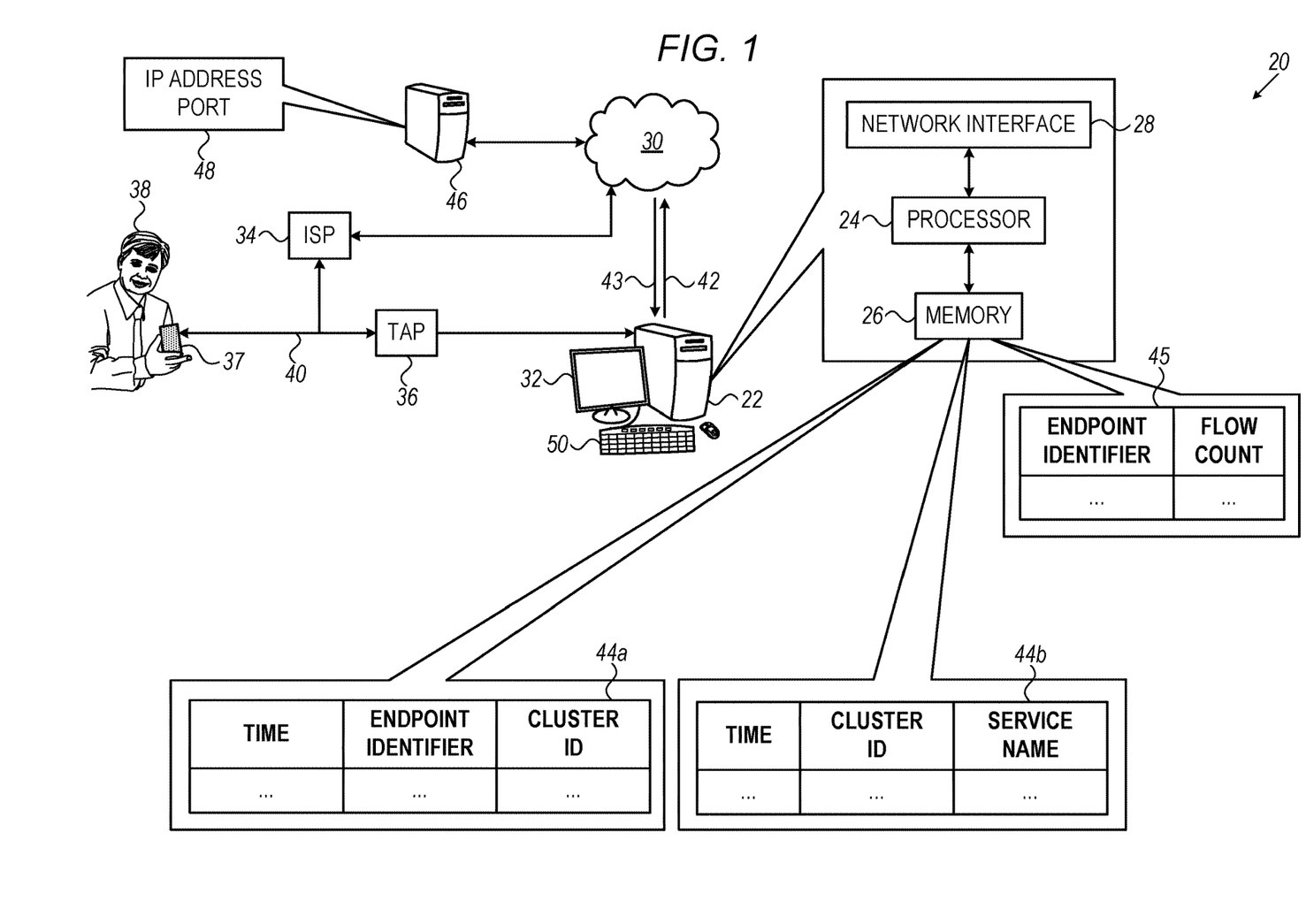
FIG. 1 is a schematic illustration of a system for associating communication endpoints with respective services, in accordance with some embodiments of the present disclosure.

Reference is initially made to FIG. 1, which is a schematic illustration of a system 20 for associating communication endpoints with respective services, in accordance with some embodiments of the present disclosure.

System 20 comprises at least one server 22 comprising a processor 24, a network interface 28, such as a network interface controller (NIC), and a memory 26. Memory 26 may comprise any volatile memory, such as a random-access memory (RAM), and/or a non-volatile memory.

System 20 further comprises a network tap 36, configured to passively intercept communication traffic exchanged over a network 30, such as the Internet. For example, tap 36 may tap an Internet service provider (ISP) 34, such that all communication packets 40 passing between ISP 34 and devices 37 of users 38 are received by the tap. Network tap 36 passes copies of packets 40 to server 22, such that processor 24 receives the copies via network interface 28. (For simplicity, the copies of the packets may be referred to herein simply as "the packets.")

As illustrated in FIG. 1, the communication packets received by tap 36 include packets belonging to flows exchanged between users 38 and communication endpoints 48 belonging to servers 46. Each such packet contains an endpoint identifier, including an Internet Protocol (IP) address and port number, identifying the communication endpoint 48 with which the packet was exchanged. For example, the packet may include an endpoint identifier such as "192.168.1.67:80," where "192.168.1.67" is the IP address and "80" is the port number.

Processor 24 is configured to ascertain the respective services that use communication endpoints 48. The processor is further configured to store, in memory 26, an association between the communication endpoints and the respective services that use the communication endpoints.

Whenever possible, the processor "passively" learns correspondences between services and communication endpoints from unencrypted Domain Name System (DNS) or Server Name Indication (SNI) responses in the received traffic. Typically, however, at least some correspondences must be learned "actively," using an active (or "investigative") technique. When performing such a technique, the processor communicates investigative traffic 42 over network 30 via network interface 28, and receives response traffic 43 in response thereto. The processor then checks if response traffic 43 indicates a correspondence between a service and a communication endpoint. Such active techniques are described below with reference to FIGS. 3-7.

Typically, the processor clusters the communication endpoints specified in packets 40 into multiple clusters, as further described below with reference to FIGS. 2-3. Upon ascertaining the service that uses any particular endpoint, the processor associates the service with the entire cluster to which the particular endpoint belongs. In other words, each of the clusters is associated, in the memory, with each of the services ascertained to use any one of the communication endpoints in the cluster.

In such embodiments, the processor typically stores the association between the communication endpoints and the services by storing two tables: a first table 44a and a second table 44b.

In first table 44a, each table entry includes the identifier of a respective endpoint along with an identifier (e.g., a serial number) of a cluster of endpoints to which the endpoint belongs. Typically, the entry further includes the time at which the endpoint was assigned to the cluster.

In second table 44b, each entry includes a respective cluster ID along with the name of a service that was ascertained to use at least one of the endpoints in the cluster. Typically, the entry further includes the last time at which the received traffic indicated a correspondence between any endpoint in the cluster and the service. In the event that multiple services are ascertained to use the same endpoint or different respective endpoints belonging to the same cluster, second table 44b includes multiple entries for the cluster. Similarly, in the event that a service is ascertained to use multiple endpoints belonging to different respective clusters, second table 44b includes multiple entries for the service.

In other embodiments, the endpoints are not clustered. In such embodiments, the processor typically stores the association between the communication endpoints and the services by storing a single table in which each entry includes (i) the identifier of a respective endpoint, (ii) the name of a service that uses the endpoint, and, typically, (iii) the last time at which the received traffic indicated a correspondence between the endpoint and the service. As described above, the table may include multiple entries for the same endpoint and/or multiple entries for the same service.

Typically, for embodiments in which clustering is performed, the processor also maintains an endpoint-identifier queue 45 of endpoint identifiers in memory 26. For each endpoint identified in the received packet copies or in response traffic 43, the processor ascertains whether the endpoint was already assigned to a cluster, and if so, the time at which the assignment was performed. If the endpoint was not yet assigned to a cluster, the processor adds the identifier of the endpoint to endpoint-identifier queue 45. Similarly, the identifier is added to endpoint-identifier queue 45 if the endpoint is assigned to a cluster but the difference between the current time and the time of the assignment is greater than a predefined threshold.

Typically, each endpoint identifier in the endpoint-identifier queue has an associated "flow count" quantifying the number of flows in which the endpoint identifier was seen, and those endpoint identifiers having a higher flow count move toward the head of the endpoint-identifier queue. In addition, typically, endpoint-identifier queue 45 has a fixed length. Before adding any endpoint identifier to the endpoint-identifier queue, the processor checks if the endpoint-identifier queue is full. If yes, the processor removes the endpoint identifier at the tail of the endpoint-identifier queue, and then inserts the new endpoint identifier several positions ahead of the tail, optionally with an associated flow count that is greater than the true flow count for the endpoint identifier. Thus, advantageously, memory space is not wasted on insignificant communication endpoints; moreover, the endpoint-identifier queue facilitates prioritizing more commonly used communication endpoints over less commonly used endpoints.

Typically, system 20 further comprises one or more input devices 50, such as a mouse and/or a keyboard, and a display 32. Using input devices 50, a user of system 20 may input a particular endpoint identifier or service name. In response to receiving the input, the processor may retrieve the name of the associated service, or the identifier of the associated communication endpoint, from memory 26, and then output the retrieved information on display 32. Alternatively, the user may input an IP address of interest. In response thereto, the processor may ascertain any services used by the IP address of interest, as further described below with reference to FIG. 8. The processor may further output the names of the services on display 32.

In general, processor 24 may be embodied as a single processor, or as a cooperatively networked or clustered set of processors belonging to different respective servers. Similarly, memory 26 may be distributed across multiple servers, at least some of which may be located remotely from processor 24.

In general, the functionality of processor 24 may be implemented solely in hardware, e.g., using one or more fixed-function or general-purpose integrated circuits, Application-Specific Integrated Circuits (ASICs), and/or Field-Programmable Gate Arrays (FPGAs). Alternatively, this functionality may be implemented at least partly in software. For example, processor may be embodied as a programmed processor comprising, for example, a central processing unit (CPU) and/or a Graphics Processing Unit (GPU). Program code, including software programs, and/or data may be loaded for execution and processing by the CPU and/or GPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

Clustering the Communication Endpoints

To cluster the communication endpoints, the processor first computes respective signature vectors for the communication endpoints. Each of the signature vectors represents statistical properties of at least some of the packets that were exchanged with a respective one of the communication endpoints. Subsequently, based on a predefined measure of vector similarity between the signature vectors, the processor clusters the communication endpoints.

Figure 2:
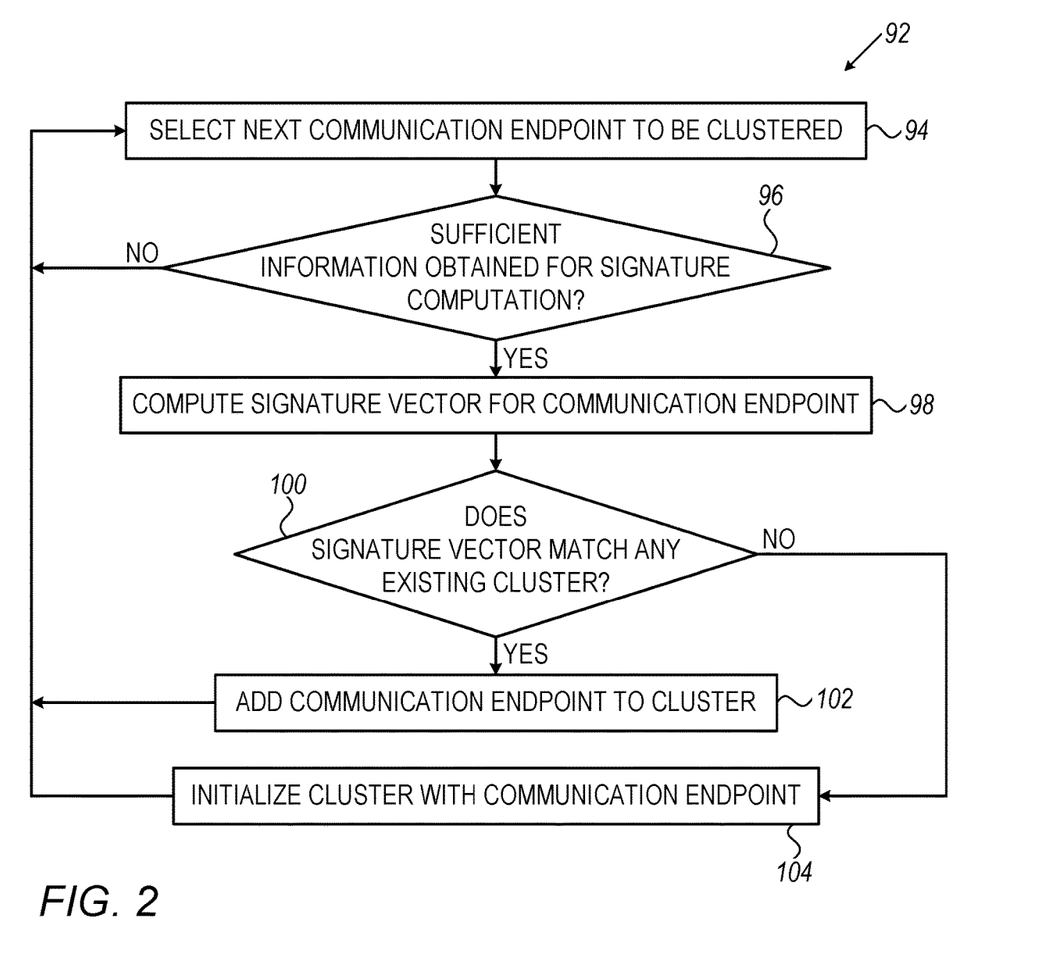
FIGS. 2-3 are flow diagrams for clustering algorithms, in accordance with some embodiments of the present disclosure.

In this regard, reference is now made to FIG. 2, which is a flow diagram for a clustering algorithm 92, in accordance with some embodiments of the present disclosure.

Clustering algorithm 92 begins at a selecting step 94, at which the processor selects a communication endpoint, identified in packets 40 (FIG. 1), to be clustered. For example, the processor may select the communication endpoint whose identifier is at the head of endpoint-identifier queue 45 (FIG. 1).

Subsequently to selecting the communication endpoint, the processor assesses, at an assessing step 96, whether sufficient information has been obtained for computing a signature vector, as further described below with reference to FIG. 9. If not, the processor returns to selecting step 94 and selects the next communication endpoint to be clustered. Otherwise, the processor proceeds to a signature-computing step 98; additionally, if the communication endpoint was selected from endpoint-identifier queue 45, the identifier of the communication endpoint is removed from the endpoint-identifier queue.

At signature-computing step 98, the processor computes a signature vector for the communication endpoint, as further described below with reference to FIG. 9. The signature vector may be stored in memory 26, e.g., in first table 44a (FIG. 1), in association with the communication endpoint.

Subsequently, the processor, at a matching step 100, applies the predefined measure of vector similarity so as to ascertain whether the signature vector matches any existing cluster. If yes, the processor adds (or "assigns") the communication endpoint to the cluster at an endpoint-adding step 102. Otherwise, the processor, at a cluster-initializing step 104, initializes a cluster with the communication endpoint, i.e., creates a new cluster and assigns the communication endpoint to the new cluster. Subsequently to endpoint-adding step 102 or cluster-initializing step 104, the processor returns to selecting step 94.

In performing endpoint-adding step 102 or cluster-initializing step 104, the processor typically adds or modifies an entry for the communication endpoint in first table 44a (FIG. 1). In the event that the endpoint was previously assigned to a different cluster, the endpoint is removed from its previous cluster, such that no endpoint is assigned to more than one cluster at a time.

Typically, at matching step 100, the processor iterates through the clusters $\{C_i\}$. For each cluster, the processor tests the signature vectors belonging to the communication endpoints in the cluster for similarity to the signature vector of the selected communication endpoint. For example, denoting the signature vector for the selected communication endpoint as V and the signature vectors belonging to the communication endpoints in $C_i$ (the $i^{th}$ cluster) as $\{V_{ij}\}$, the processor may compute $D(V, \overline{V}_i)$, where $\overline{V}_i$ is the average of $\{V_{ij}\}$ and $D(V, \overline{V}_i)$ is the distance between the two vectors per the predefined measure of vector similarity. Alternatively, the processor may compute $\min_j D(V,V_{ij})$, i.e., the distance between V and the vector in $\{V_{ij}\}$ that is most similar to V. Subsequently, the processor may compare the distance to a predefined threshold. If the distance is less than the threshold, the processor may ascertain that the communication endpoint belongs in the $i^{th}$ cluster, and hence proceed to endpoint-adding step 102. Otherwise, the processor may proceed to the next cluster. In general, any suitable optimization techniques may be used to minimize the number of clusters that must be tested before a match is found.

In many cases, the statistical properties of the packets in a flow vary as a function of the respective positions of the packets in the flow. Hence, in some embodiments, the processor groups the received packets into multiple groups based on the respective positions of the packets in the respective flows to which the packets belong. The processor further performs the aforementioned signature-vector computations and clustering separately for each of the groups, such that a given cluster $C_i$ may have multiple instances $\{C_{i_k}\}$ for k=1 . . . K being the number of groups.

For example, the processor may group the packets into two groups: one group containing packets belonging to the beginnings of the flows, and another group containing packets belonging to the continuations of the flows. For example, the first group may contain the first Z packets from each flow, Z being a predefined constant, while the second group may contain the subsequent packets from each flow.

As another example, one group may contain packets communicated after a threshold duration of silence, and another group may contain all other packets. As yet another example, the latter grouping scheme may be combined with the former grouping scheme, such that the packets are grouped into four groups altogether.

In such embodiments, at signature-computing step 98, the processor may compute a different respective signature vector for each group of packets exchanged with the selected communication endpoint. Subsequently, matching step 100 may be performed separately for each of the signature vectors. If, based on matching step 100, the processor ascertains that the groups of packets belong to different respective instances of the same cluster, the processor adds the communication endpoint to each instance of the cluster at endpoint-adding step 102. Otherwise, the processor initializes multiple instances of a new cluster with the communication endpoint.

Figure 3:
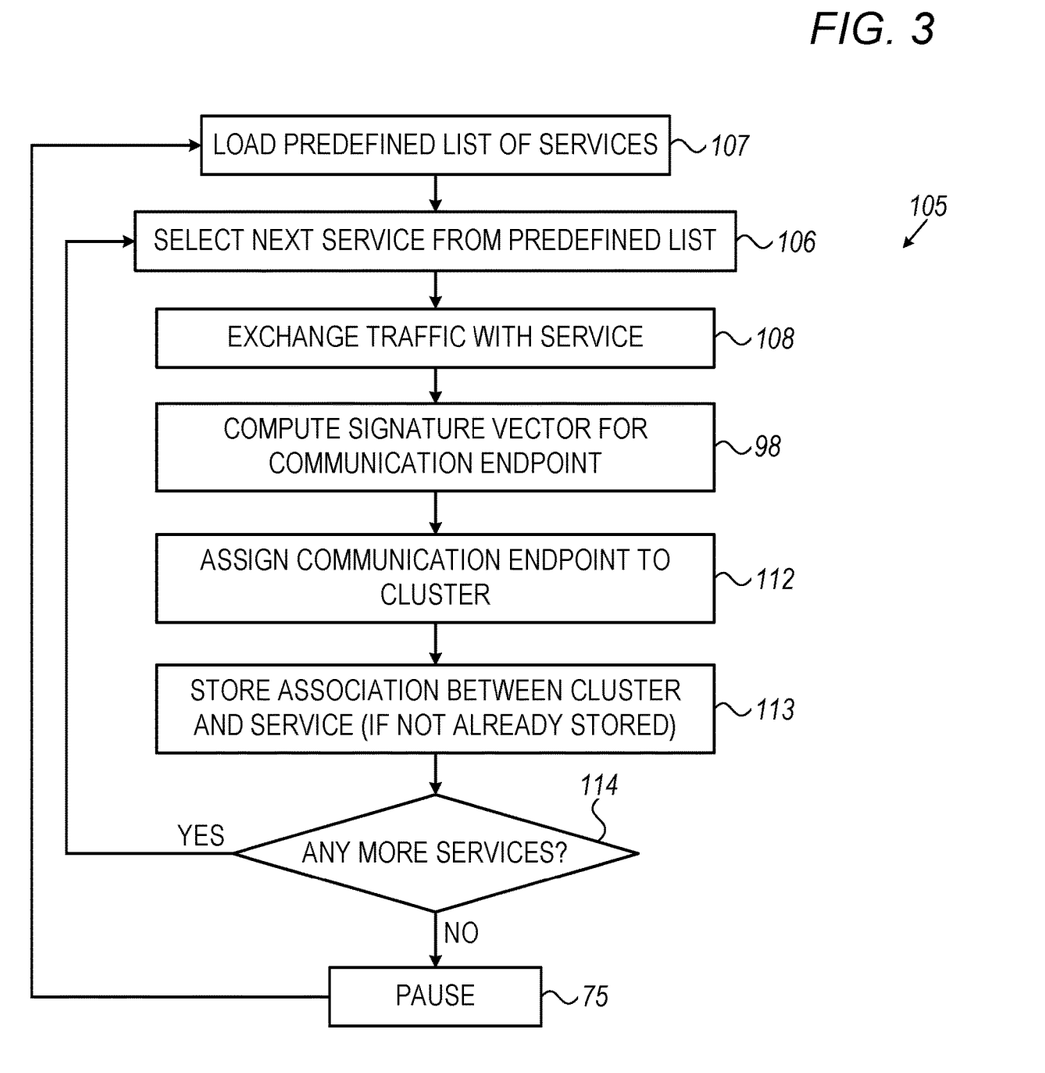

Reference is now made to FIG. 3, which is a flow diagram for another clustering algorithm 105 that may be executed by the processor, in accordance with some embodiments of the present disclosure.

Algorithm 105 begins at a first list-loading step 107, at which the processor loads a predefined list of services from memory 26 (FIG. 1). The list may include, for example, the $M_1$ most visited domains and the $M_2$ most used applications, where $M_1$ and $M_2$ may be any suitable numbers.

Subsequently to loading the list, the processor, at a service-selecting step 106, selects the first service from the list. Subsequently to selecting the service, the processor, at a traffic-exchanging step 108, exchanges traffic with the service, thus (i) learning the communication endpoint used by the service, and (ii) generating a sufficient amount of traffic for computing a signature vector. The processor then computes a signature vector for the communication endpoint based on the exchanged traffic, at signature-computing step 98. (For embodiments in which the packets are grouped as described above, signature-computing step 98 may be performed separately for each group of packets belonging to the exchanged traffic.)

Subsequently, based on the signature vector, the processor assigns the communication endpoint to a cluster at an assigning step 112, which includes matching step 100 along with endpoint-adding step 102 or cluster-initializing step 104 of FIG. 2. (In the event that the endpoint was previously assigned to a different cluster, the endpoint is removed from its previous cluster.) In addition, at an associating step 113, the processor stores an association between the cluster and the service, e.g., by adding the appropriate entry to second table 44b (FIG. 1), if the association is not already stored.

Subsequently, the processor checks, at a first checking step 114, whether any more services remain in the list. If yes, the processor returns to service-selecting step 106, and selects the next service in the list. Otherwise, the processor pauses for a predefined amount of time at a pausing step 75, and then returns to first list-loading step 107.

Investigative Techniques

Typically, the processor uses two different types of investigative techniques to associate the communication endpoints with the corresponding services. In the first type of technique, the processor communicates investigative traffic 42 (FIG. 1) for a given communication endpoint and checks response traffic 43 (FIG. 1) for the corresponding service. In the second type of technique, the processor communicates investigative traffic for a given service and checks the response traffic for the corresponding communication endpoint. Each type of technique is hereby described.

(i) First Type of Investigative Technique

Figure 4:
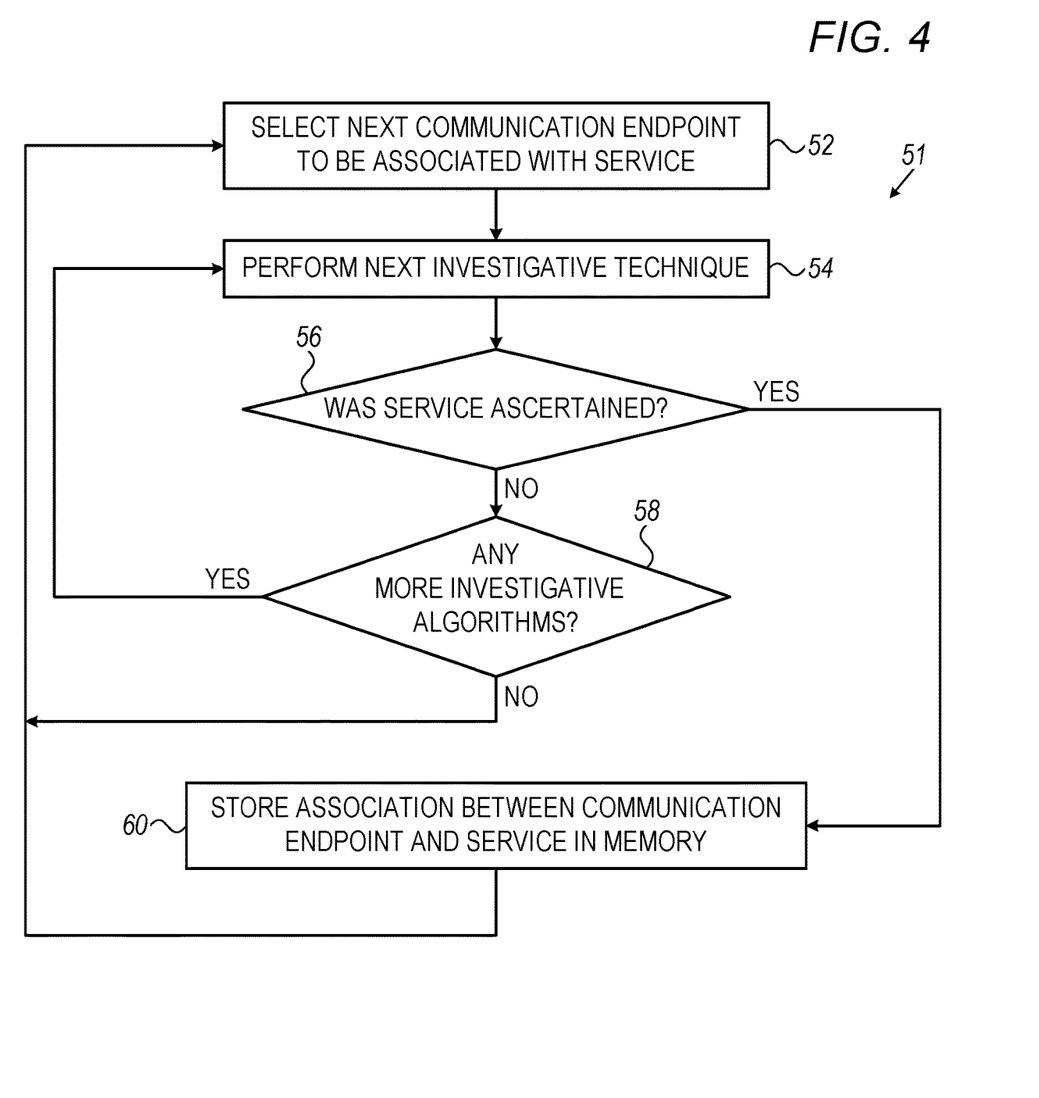
FIG. 4 is an iterative algorithm for using a type of investigative technique, in accordance with some embodiments of the present disclosure.

Reference is now made to FIG. 4, which is a flow diagram for an iterative algorithm 51 for using the first type of investigative technique, in accordance with some embodiments of the present disclosure.

At the start of each iteration of algorithm 51, the processor, at an endpoint-selecting step 52, selects the next communication endpoint to be associated with a service. In performing this selection, the processor typically prioritizes those communication endpoints that were not yet associated with a service. In the event that no such endpoint is available, the processor may select a communication endpoint that was already associated with a service.

For example, the processor, by iterating through the entries in second table 44b (FIG. 1), may identify any cluster whose latest time of association with a service precedes the current time by more than a predefined threshold. The processor may then select one of the endpoints in the identified cluster.

For embodiments in which clustering is performed, algorithm is typically executed in parallel to one or both of the clustering algorithms described above. A communication endpoint may be selected regardless of whether the endpoint was already assigned to a cluster.

Subsequently to selecting an endpoint, the processor, at an investigating step 54, performs an investigative technique involving the communication of investigative traffic 42 (FIG. 1). Subsequently to performing investigating step 54, the processor checks, at a second checking step 56, whether the investigative technique allowed the service using the communication endpoint to be ascertained.

If the service was ascertained, the processor, at a storing step 60, stores an association between the communication endpoint and the ascertained service in memory 26. Otherwise, the processor checks, at a third checking step 58, whether any more investigative techniques remain to be performed. If yes, the processor returns to investigating step 54 and performs another investigative technique.

For embodiments in which clustering is performed, storing step 60 includes storing an association between the ascertained service and the entire cluster to which the communication endpoint belongs. For example, as described above with reference to FIG. 1, the name of the service may be stored in association with the cluster ID in second table 44b. In the event that the communication endpoint was not yet assigned to a cluster, a temporary cluster may be initialized with the communication endpoint, and the temporary cluster may then be associated with the service.

Subsequently to performing storing step 60, or if no investigative technique allowed the service to be ascertained, the processor returns to endpoint-selecting step 52.

Figure 5:
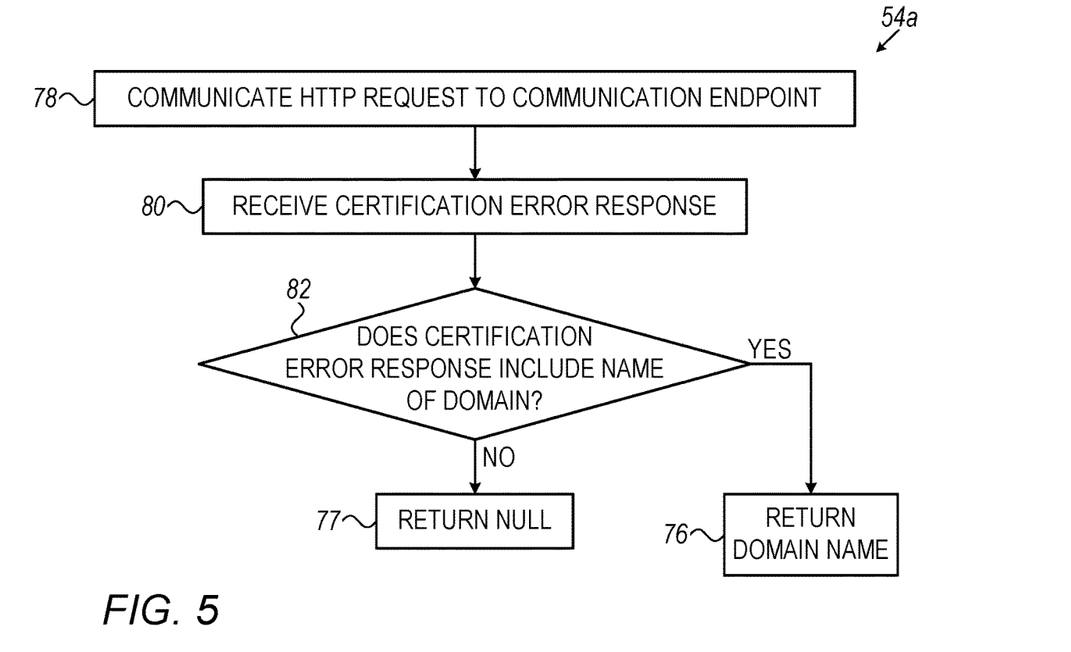
FIGS. 5-7 are flow diagrams for example investigative techniques, in accordance with some embodiments of the present disclosure.

Reference is now made to FIG. 5, which is a flow diagram for an example investigative technique 54a for investigating step 54, in accordance with some embodiments of the present disclosure.

Technique 54a begins with an HTTP-request-communicating step 78, at which the processor communicates a Hypertext Transfer Protocol (HTTP) request to the communication endpoint selected at endpoint-selecting step 52 (FIG. 4). (The HTTP request thus belongs to investigative traffic 42 (FIG. 1).) Subsequently to communicating the HTTP request, the processor receives a certification error response to the request at an error-response-receiving step 80. (The certification error response thus belongs to response traffic 43 (FIG. 1).)

Subsequently, the processor checks, at an error-response-inspecting step 82, whether the certification error response includes the name of a domain. If yes, the processor ascertains that the domain uses the selected communication endpoint, and therefore returns the name of the domain at domain-name-returning step 76. Otherwise, the processor performs null-outputting step 77, thus indicating that no domain name was found.

Figure 6:
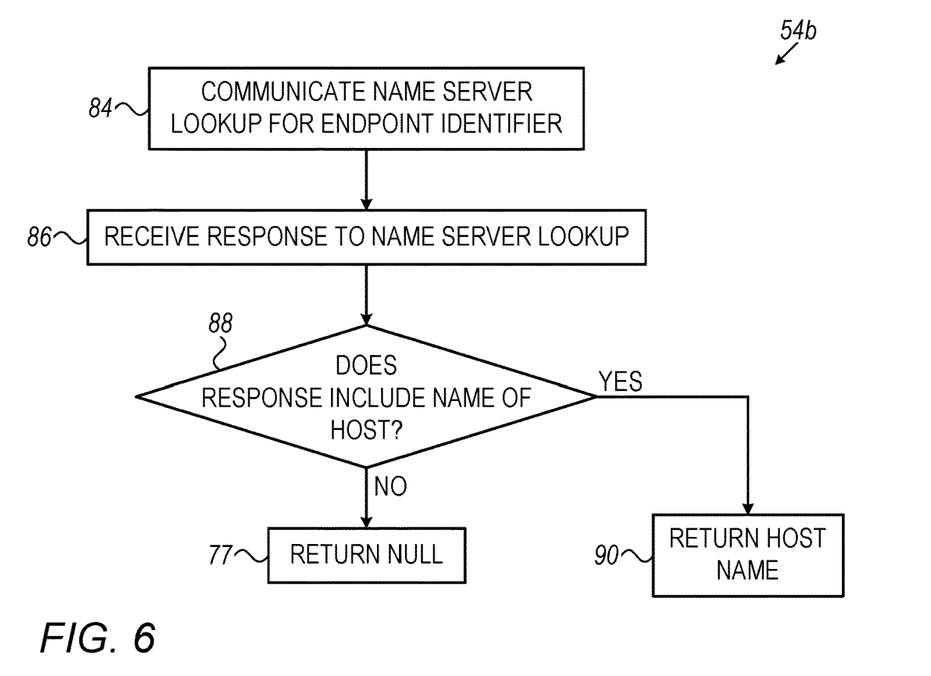

Reference is now made to FIG. 6, which is a flow diagram for another example investigative technique 54b for investigating step 54 (FIG. 3), in accordance with some embodiments of the present disclosure.

Technique 54b begins with a name-server-lookup step 84, at which the processor communicates a name server lookup for the identifier of the communication endpoint selected at endpoint-selecting step 52 (FIG. 4). (The name server lookup thus belongs to investigative traffic 42 (FIG. 1).) For example, the processor may pass the IP address of the communication endpoint to the Python function gethostbyaddr( ) or simply execute the "nslookup" command for the IP address.

Subsequently to communicating the name server lookup, the processor receives a response to the name server lookup at a lookup-response-receiving step 86. (The response to the name server lookup thus belongs to response traffic 43 (FIG. 1).) Subsequently, the processor checks, at a lookup-response-inspecting step 88, whether the response includes the name of a host. If yes, the processor returns the name of the host at a host-name-returning step 90. (Subsequently, the processor may attempt, at second checking step 56 (FIG. 4), to derive the name of the service from the name of the host.) Otherwise, the processor performs null-outputting step 77, thus indicating that no host name was found.

(ii) Second Type of Investigative Technique

As noted above, in the second type of investigative technique, the processor communicates investigative traffic for a given service, rather than for a given endpoint.

For example, as described above with reference to FIG. 3, when executing clustering algorithm 105, the processor may learn the communication endpoint corresponding to a particular service by exchanging traffic with the service. (Thus, traffic communicated to the service belongs to investigative traffic 42 (FIG. 1).)

Figure 7:
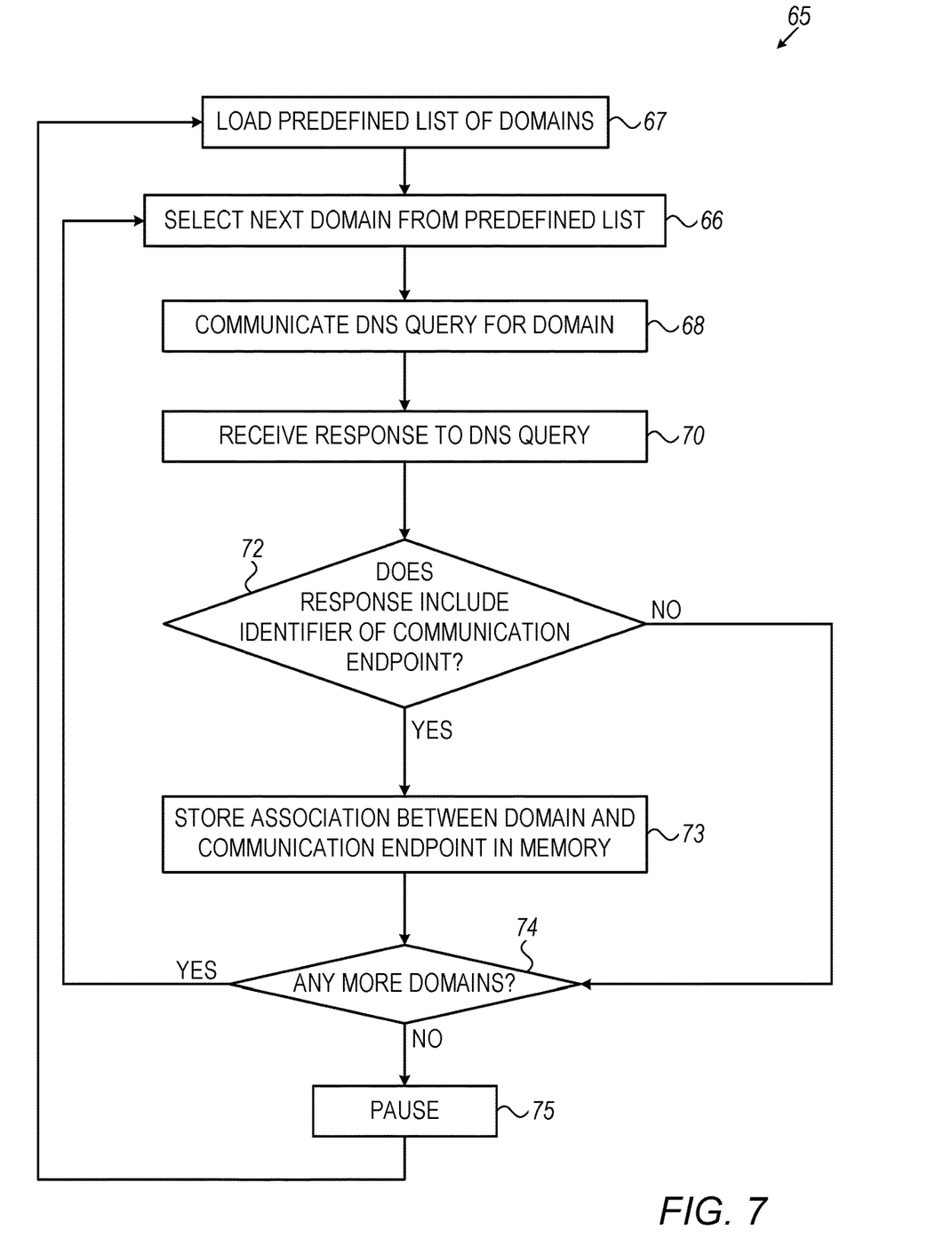

For another example, reference is now made to FIG. 7, which is a flow diagram for an example investigative technique 65 of the second type, in accordance with some embodiments of the present disclosure. Investigative technique 65 may be performed in parallel to any of the other computational processes described herein.

Investigative technique 65 begins with a second list-loading step 67, at which the processor loads a predefined list of domains from memory 26 (FIG. 1). The list may include the M most visited domains, where M may be any suitable number.

Subsequently to loading the list, the processor selects the first domain from the list, at a domain-selecting step 66. For each selected domain, the processor, at a DNS-querying step 68, communicates a DNS query for the domain. (The DNS query thus belongs to investigative traffic 42 (FIG. 1).) Subsequently to communicating the DNS query, the processor receives a response to the DNS query, at a DNS-response-receiving step 70. (The response to the DNS query thus belongs to response traffic 43 (FIG. 1).)

Subsequently to receiving the response, the processor checks, at a DNS-response-inspecting step 72, whether the response includes the identifier of a communication endpoint. If not, the processor returns to domain-selecting step 66. Otherwise, the processor, at an association-storing step 73, stores an association between the domain and the endpoint identifier, as described above with reference to storing step 60 of FIG. 4. Subsequently, the processor, at a fourth checking step 74, checks whether any more domains remain in the list. If yes, the processor returns to domain-selecting step 66 and selects the next domain from the list. Otherwise, the processor pauses for a predefined amount of time at pausing step 75, and then returns to second list-loading step 67.

Monitoring an IP Address of Interest

Figure 8:
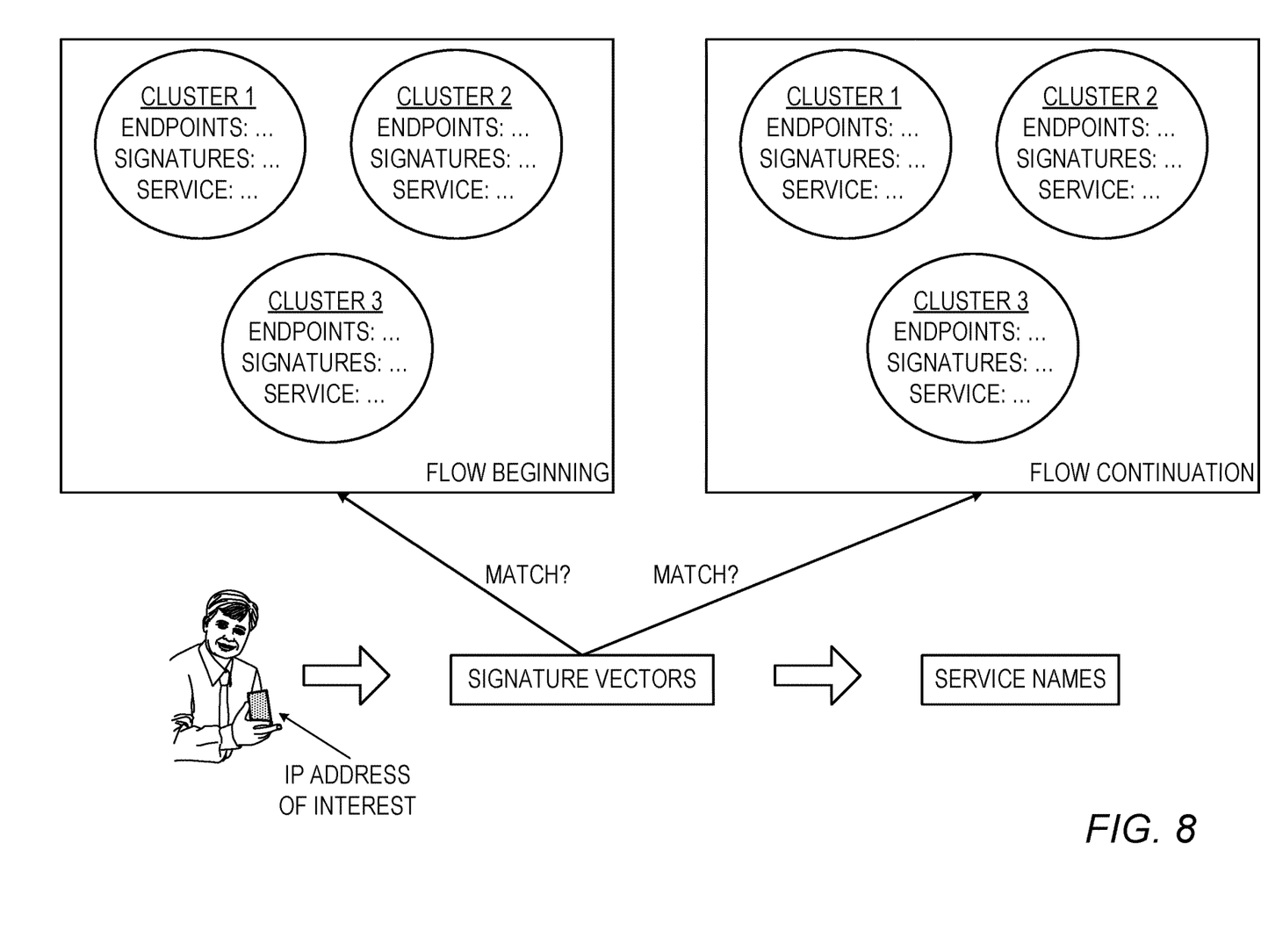
FIG. 8 is a schematic illustration of a clustering of communication endpoints, in accordance with some embodiments of the present disclosure.

Reference is now made to FIG. 8, which is a schematic illustration of a clustering of communication endpoints, in accordance with some embodiments of the present disclosure. By way of example, FIG. 8 depicts a scenario in which the processor has clustered the communication endpoints into three clusters, each of which has a first instance for the flow-beginning position (including, for example, the first K packets of each flow), and a second instance for the flow-continuation position.

At any point in time, the processor may receive an IP address of interest from a user of system 20, as described above with reference to FIG. 1. In response thereto, the processor begins outputting the names of the services with which the IP address of interest communicates.

In particular, for each communication endpoint appearing in the traffic exchanged with the IP address of interest, the processor first checks whether the communication endpoint is already associated with a service in memory 26 (FIG. 1). If yes, the processor outputs the name of the service. Otherwise, the processor computes one or more signature vectors (e.g., a flow-beginning signature vector and a flow-continuation signature vector) for the communication endpoint, provided the flows exchanged with the communication endpoint provide sufficient information for this computation. Subsequently, the processor attempts to match at least one of the signature vectors to one of the clusters, as illustrated in FIG. 8. If a match is obtained, the processor outputs the service name and, typically, adds the communication endpoint to the matched cluster. Otherwise, the processor may perform an investigative technique so as to discover the service.

For cases in which multiple signature vectors (corresponding to multiple packet-groups) are computed, the matching may be performed in stages. For example, the processor may first attempt to match the flow-continuation signature vector. If a match to a single cluster is obtained, the processor returns the service associated with the cluster. Otherwise, the processor attempts to match the flow-beginning signature vector.

Alternatively, the processor may require that all signature vectors be matched. In other words, the processor may require that the signature vectors match different respective instances of the same cluster.

Computing the Signature Vectors

Figure 9:
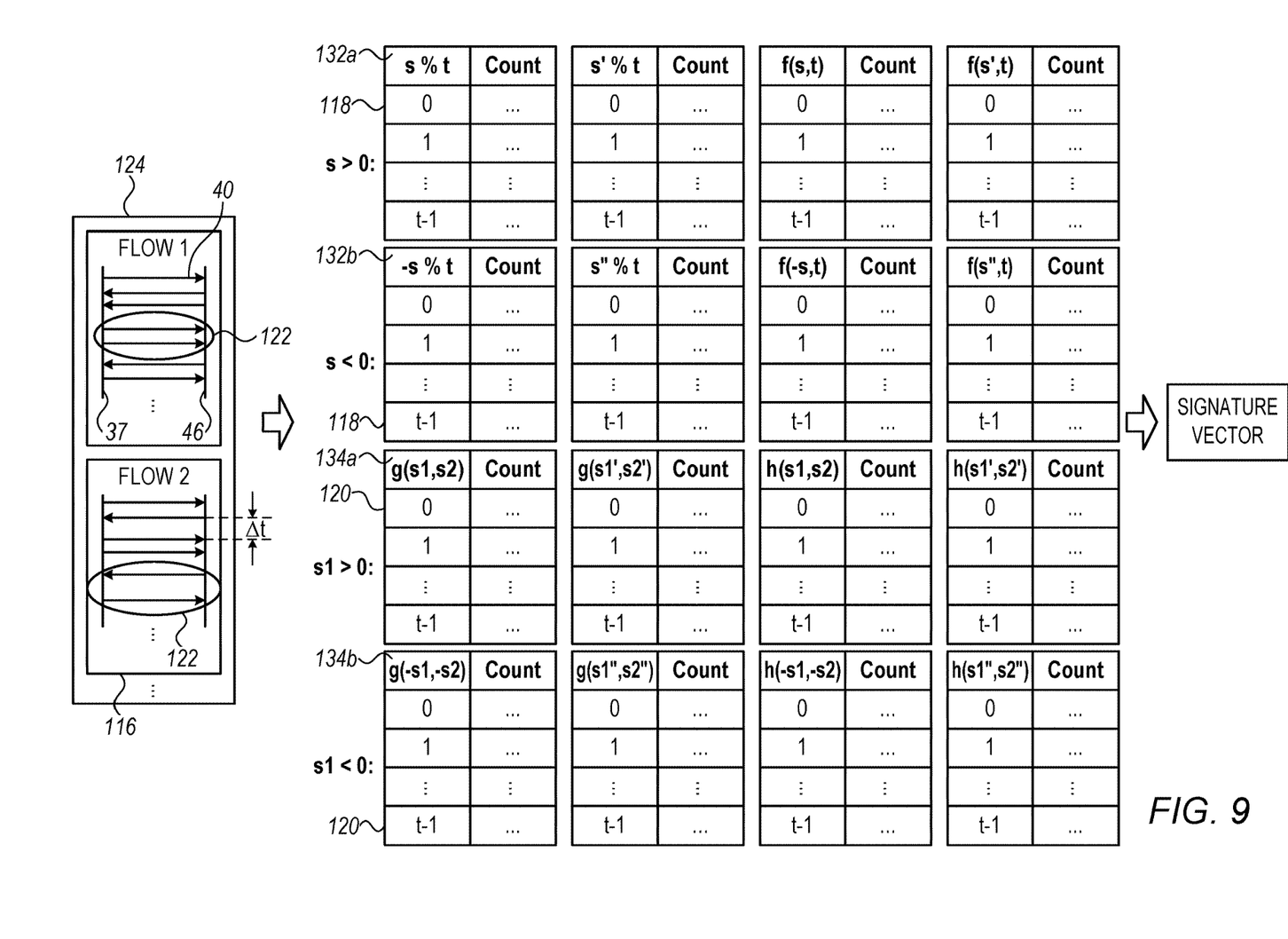
FIG. 9 is a schematic illustration of a technique for computing a signature vector, in accordance with some embodiments of the present disclosure.

Reference is now made to FIG. 9, which is a schematic illustration of a technique for computing a signature vector, in accordance with some embodiments of the present disclosure. The technique illustrated in FIG. 9 may be performed as part of signature-computing step 98 (FIGS. 2-3), in which a signature is computed for a particular communication endpoint. (For simplicity, it is assumed in FIG. 9 that the signature-vector computation does not differentiate between different packet positions in a flow.)

The signature vector is based on one or more flows 116, in each of which packets 40 are exchanged between a server 46, which uses the communication endpoint, and a client. For example, as described above with reference to FIG. 1, the packets may be exchanged between server 46 and a client device 37 belonging to a user. Alternatively or additionally, as described above with reference to FIG. 3, the packets may be exchanged between server 46 and the processor.

More specifically, as described above with reference to FIGS. 1-2, the signature vector represents statistical properties of at least some of the packets in flows 116. For example, the signature vector may represent statistical properties of inter-packet times $\Delta t$ between successive packets 40. Alternatively or additionally, the signature vector may represent statistical properties of the respective sizes "s" of at least some of the packets. Alternatively or additionally, the signature vector may represent statistical properties of respective size-pairs (s1, s2) belonging to pairs 122 of successive packets in flows 116. (Typically, in such embodiments, each packet is paired twice: once with the preceding packet in the flow, and once with the succeeding packet in the flow.)

Typically, for computing the signature vector, the processor computes the size of each packet as a signed number, the sign depending on the direction in which the packet was communicated. For example, a packet communicated from client device 37 to server 46 may have a positive size, while a packet communicated from the server to the client device may have a negative size. The sizes may be expressed in units of bytes or in any other suitable units.

Typically, the flows are stored in a flow queue 124 in memory 26 (FIG. 1). Prior to computing the signature vector, the processor repeatedly iterates through flow queue 124, extracting information needed for computing the relevant statistical properties. During each iteration, any flows that have ended, or for which no new packets have been received for a predetermined duration of time, may be deleted from the flow queue.

For example, in some embodiments, during each iteration through flow queue 124, the processor applies one or more functions to the respective sizes of at least some of the new packets 40 in the flow queue. In particular, the processor may apply a first set of functions 132a to positive sizes, and a second set of functions 132b to negative sizes. Each function has a corresponding histogram 118, which includes a respective count for each possible output from the function. Each time the function is applied, the processor updates histogram 118, by increasing the count for the function output. For example, if the function outputs (i.e., returns) 17, the processor increases the count for 17 in histogram 118.

As a purely illustrative example, as illustrated in FIG. 9, the processor may apply the following four functions to each positive size: (i) s % t, where t is any suitable positive integer having the same units as s, such as 100 bytes, (ii) s' % t, where s'=min(s,L) for a suitable size-limit L, (iii) f(s,t)=min (t−1, [(t/c)*$\log_2$ (s+1)]), where c is any suitable positive integer less than t (e.g., 20) and [ ] indicates rounding to the nearest integer, and (iv) f(s',t). Similarly, the processor may apply −s % t, s" % t, f(−s,t), and f(s",t), where s"=min(−s,L), to each negative size. Thus, each histogram 118 may include t counts.

Alternatively or additionally, during each iteration through flow queue 124, the processor may apply one or more functions to respective size-pairs (s1, s2), each of the pairs belonging to successive packets 40 within any flow. In particular, the processor may apply a first set of functions 134a to size-pairs in which s1>0, and a second set of functions 134b to size-pairs in which s1<0. The processor may further update respective histograms 120 corresponding to the functions, as described above for histograms 118.

As a purely illustrative example, as illustrated in FIG. 9, the processor may apply the following four functions to each pair of sizes in which s1>0: (i) g(s1,s2)=(p*(s1% t)+(s2% t))% t, where p is any suitable parameter, (ii) g(s1',s2'), (iii) h(s1,s2)=(p*f (s1, t)+f(s2,t))% t, and (iv) h(s1',s2'). Similarly, the processor may apply g(−s1,−s2), g(s1",s2"), h(−s1,−s2), and h(s1",s2") to each pair of sizes in which s1<0. Thus, each histogram 120 may include t counts.

Prior to computing the signature vector (e.g., at signature-computing step 98 of FIG. 2), the processor assesses (e.g., in assessing step 96 of FIG. 2) whether sufficient information has been obtained from flows 116 for the computation. For example, the processor may check whether one or more of the following numbers exceed respective predefined thresholds: the number of unique sizes to which functions 132a and 132b have been applied, the sum of the counts in each histogram 118, the number of unique size-pairs to which functions 134a and 134b have been applied, the sum of the counts in each histogram 120, the total number of collected flows, and the total number of packets in the flows. In response to ascertaining that sufficient information has been obtained, the processor proceeds to compute the signature vector.

For embodiments in which histograms 118 and/or histograms 120 are computed, the processor computes the signature vector from the histograms. For example, in the case shown in FIG. 9, the processor may compute a signature vector in which the 16$t$ counts belonging to the 16 histograms are arranged in sequence. For embodiments in which only histograms 118 or histograms 120 are computed, the processor may arrange the 8$t$ counts in sequence.

In some embodiments, the predefined measure of similarity, which is used to compare two signature vectors to one another, is the cosine similarity, i.e., the distance function D(x,y) between two signature vectors x and y is the cosine distance. Advantageously, this measure of similarity is indifferent to the respective magnitudes of the vectors, such that no normalization of the signature vectors is needed. For embodiments in which a different measure of similarity is used, the processor may normalize the signature vectors prior to computing the distance.

It is noted that the signature-computation techniques described herein may be used even in situations in which the processor receives only one-way traffic from tap 36 (FIG. 1). In other words, a signature vector may be computed based only on packets for which s>0, or only on packets for which s<0.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a memory; and
a processor, configured to:
receive respective copies of communication packets exchanged, over a network, with respective communication endpoints belonging to respective servers,
the packets containing respective endpoint identifiers, each of which includes a respective Internet Protocol (IP) address and port number identifying the communication endpoint with which the packet containing the endpoint identifier was exchanged,
compute respective signature vectors for the communication endpoints, each of the signature vectors representing statistical properties of those of the packets that were exchanged with a different respective one of the communication endpoints,
based on a predefined measure of vector similarity between the signature vectors, cluster the communication endpoints into multiple clusters,
by communicating investigative traffic over the network, ascertain respective services that use the communication endpoints, and
in response to ascertaining the services, store an association between the communication endpoints and the services, respectively, in the memory, wherein the processor is configured to store the association by associating each of the clusters, in the memory, with each of the services ascertained to use any one of the communication endpoints in the cluster.

2. The system according to claim 1,
wherein the services include at least one domain,
wherein the investigative traffic includes a Domain Name System (DNS) query for the domain, and
wherein the processor is configured to ascertain that the domain uses a particular one of the communication endpoints by:
receiving a DNS response to the DNS query, and
ascertaining that the domain uses the particular one of the communication endpoints, in response to the endpoint identifier that identifies the particular one of the communication endpoints being included in the DNS response.

3. The system according to claim 1,
wherein the services include at least one domain,
wherein the investigative traffic includes a Hypertext Transfer Protocol (HTTP) request to a particular one of the communication endpoints, and
wherein the processor is configured to ascertain that the domain uses the particular one of the communication endpoints by:
receiving a certification error response to the HTTP request, and
ascertaining that the domain uses the particular one of the communication endpoints, in response to a name of the domain being included in the certification error response.

4. The system according to claim 1, wherein the processor is further configured to exchange traffic with a particular one of the services, and wherein the processor is configured to compute the signature vector for the communication endpoint used by the particular one of the services based on the exchanged traffic.

5. The system according to claim 1,
wherein the processor is further configured to group the packets into multiple groups based on respective positions of the packets in respective flows to which the packets belong, and
wherein the processor is configured to cluster the communication endpoints separately for each of the groups.

6. The system according to claim 1, wherein, for each of the communication endpoints, the statistical properties include statistical properties of inter-packet times between successive pairs of those of the packets that were exchanged with the communication endpoint.

7. The system according to claim 1, wherein, for each of the communication endpoints, the statistical properties include statistical properties of respective sizes of those of the packets that were exchanged with the communication endpoint.

8. The system according to claim 7, wherein the processor is configured to compute the signature vector for the communication endpoint by:
applying one or more functions to the sizes so as to obtain multiple sets of function outputs,
computing respective histograms of the sets of function outputs, and
computing the signature vector from the histograms.

9. The system according to claim 7, wherein the processor is configured to compute the signature vector for the communication endpoint by:
applying one or more functions to respective pairs of the sizes, each of the pairs belonging to successive ones of the packets within any flow, so as to obtain multiple sets of function outputs,
computing respective histograms of the sets of function outputs, and
computing the signature vector from the histograms.

10. The system according to claim 1, wherein the predefined measure of similarity is a cosine similarity.

11. A method, comprising:
receiving respective copies of communication packets exchanged, over a network, with respective communication endpoints belonging to respective servers,
the packets containing respective endpoint identifiers, each of which includes a respective Internet Protocol (IP) address and port number identifying the communication endpoint with which the packet containing the endpoint identifier was exchanged;
computing respective signature vectors for the communication endpoints, each of the signature vectors representing statistical properties of those of the packets that were exchanged with a different respective one of the communication endpoints;
based on a predefined measure of vector similarity between the signature vectors, clustering the communication endpoints into multiple clusters,
by communicating investigative traffic over the network, ascertaining respective services that use the communication endpoints; and
in response to ascertaining the services, storing an association between the communication endpoints and the services, respectively, in a memory, wherein storing the association comprises storing the association by associating each of the clusters, in the memory, with each of the services ascertained to use any one of the communication endpoints in the cluster.

12. The method according to claim 11,
wherein the services include at least one domain, wherein communicating the investigative traffic comprises communicating a Domain Name System (DNS) query for the domain, and wherein ascertaining the services comprises:

receiving a DNS response to the DNS query, and ascertaining that the domain uses a particular one of the communication endpoints, in response to the endpoint identifier that identifies the particular one of the communication endpoints being included in the DNS response.

13. The method according to claim 11, wherein the services include at least one domain, wherein communicating the investigative traffic comprises communicating a Hypertext Transfer Protocol (HTTP) request to a particular one of the communication endpoints, and wherein ascertaining the services comprises:

receiving a certification error response to the HTTP request; and ascertaining that the domain uses the particular one of the communication endpoints, in response to a name of the domain being included in the certification error response.

14. The method according to claim 11, further comprising exchanging traffic with a particular one of the services, wherein computing the signature vectors comprises computing the signature vector for the communication endpoint used by the particular one of the services based on the exchanged traffic.

15. The method according to claim 11, further comprising grouping the packets into multiple groups based on respective positions of the packets in respective flows to which the packets belong, wherein clustering the communication endpoints comprises clustering the communication endpoints separately for each of the groups.

16. The method according to claim 11, wherein, for each of the communication endpoints, the statistical properties include statistical properties of inter-packet times between successive pairs of those of the packets that were exchanged with the communication endpoint.

17. The method according to claim 11, wherein, for each of the communication endpoints, the statistical properties include statistical properties of respective sizes of those of the packets that were exchanged with the communication endpoint.

18. The method according to claim 17, wherein computing the signature vector for the communication endpoint comprises:

by applying one or more functions to the sizes, obtaining multiple sets of function outputs, computing respective histograms of the sets of function outputs, and computing the signature vector from the histograms.

* * * * *